United States Patent [19]

Osipov et al.

[11] 3,913,818

[45] Oct. 21, 1975

[54] DEVICE FOR PREPARING INTEGRATED MICROCIRCUITS FOR PRINTED WIRING

[76] Inventors: Anatoly Alexandrovich Osipov, Kadomtseva, 7, kv. 26; Nikolai Semenovich Pekov, ulitsa B. Mariinskaya, 2, kv. 77, both of Moscow, U.S.S.R.

[22] Filed: Oct. 26, 1973

[21] Appl. No.: 410,257

[52] U.S. Cl. ........................ 228/3.1; 228/19; 228/41

[51] Int. Cl.² ........................ B23K 21/00; B23P 3/02

[58] Field of Search ............... 228/1, 5, 6, 13, 3, 56, 228/19, 41; 29/500, 471.3, 497.5, 471.1

[56] References Cited

UNITED STATES PATENTS

| | | | |
|---|---|---|---|
| 3,283,987 | 11/1966 | Kauffman | 228/41 X |
| 3,475,814 | 11/1969 | Santangini | 29/497.5 X |
| 3,711,939 | 1/1973 | Stoll | 29/497.5 X |
| 3,772,764 | 11/1973 | Furnival | 29/497.5 X |

*Primary Examiner*—Ronald J. Shore

*Attorney, Agent, or Firm*—Waters, Schwartz & Nissen

[57] ABSTRACT

A device for preparing integrated microcircuits for printed wiring, comprising a male die, a female die, a solder supply unit and blades for cutting microcircuit leads. The female die is constructed in the form of two fixed jaws, with a spring-loaded microcircuit holder arranged therebetween. The guides of the solder supply unit are located in the plane of the upper base of the jaws.

3 Claims, 5 Drawing Figures

DEVICE FOR PREPARING INTEGRATED MICROCIRCUITS FOR PRINTED WIRING

The present invention relates to manufacturing microcircuit radioelectronic equipment, and more particularly to devices for preparing integrated microcircuits for printed wiring.

Preparation of integrated microcircuits for printed wiring consists in molding and cutting microcircuit leads of preset dimensions and applying onto them metered amounts of a solder in a solid state.

Known devices used for preparing integrated microcircuits for printed wiring present a combination of separate attachments which make up an operation line to carry out, in consecutive order, the operations of lead molding and cutting and applying a solder onto leads.

Molding and cutting of microcircuit leads is carried out with the aid of a device comprising a male die arranged movably between two blades for lead cutting, a female die and a microcircuit holder. The female die and the holder are made as a single member mounted on a fixed base.

A device for mechanical application of a solder onto leads comprises, in addition to a male die, female die and a microcircuit holder, a solder supply unit also mounted upon the base.

After molding and cutting leads in one attachment, a microcircuit is transferred by hand into a holder of the other attachment where a solder fed via the guides of the solder supply unit is applied onto the leads of the microcircuit and a stroke of the male die molds them on the outer side.

The above design of the known devices for preparing microcircuits for printed wiring is not efficient enough due to manual handling and transfer of microcircuits from one attachment to the other.

The use for these purposes of automated means makes the device too complicated and brings about a number of serious problems due to miniaüture dimensions of microcircuits and leads thereof, the absence of clear-cut technological bases for them, etc.

The above factors do not permit of employing the known devices for preparing microcircuits for printed wiring in automatic lines.

In addition, application of a solder in such devices onto the lead surfaces opposite to the contact surfaces hampers the solder flow in the process of printed wiring of microcircuits.

It is an object of the present invention to provide a device which would ensure, in the course of one stroke of the male die and without any transfer of the microcircuit, the operations of molding and cutting leads and of the application of metered amounts of solder onto them on the side of the contact surfaces.

This object is attained by that in a device for preparing integrated microcircuits for printed wiring, comprising a male die, a base mounted whereupon are a female die and a microcircuit holder, a solder supply unit with guides, and blades for lead cutting, the female die is made, in accordance with the invention, in the form of two fixed jaws, with a spring-loaded microcircuit holder arranged therebetween whereas the guides of the solder supply unit are arranged in the plane of the upper base of the jaws.

It is expedient that the blades for microcircuit lead cutting be mounted upon the outer lateral surfaces of the fixed jaws.

The present invention makes it possible to carry out a complete cycle of preparing a microcircuit for printed wiring in one device as a result of one stroke of the male die. This makes unnecessary transferring a microcircuit in the course of preparation thereof for printed wiring, which raises the efficiency of the device.

In addition, the application of a solder onto leads on the side of the contact surfaces thereof is expedient in that it, first, improves conditions of further printed wiring and, second, makes it possible to use the solder as an elastic member (in view of the fact that the solder is considerably softer than the lead material) in order to press leads onto the male die in the process of molding and cutting thereof, which protects leads and their coating from damage in the course of molding and cutting thereof.

The present invention will hereinafter be explained in greater detail with reference to a description of a preferred embodiment thereof read in conjunction with the accompanying drawings, wherein.

Figure 1:
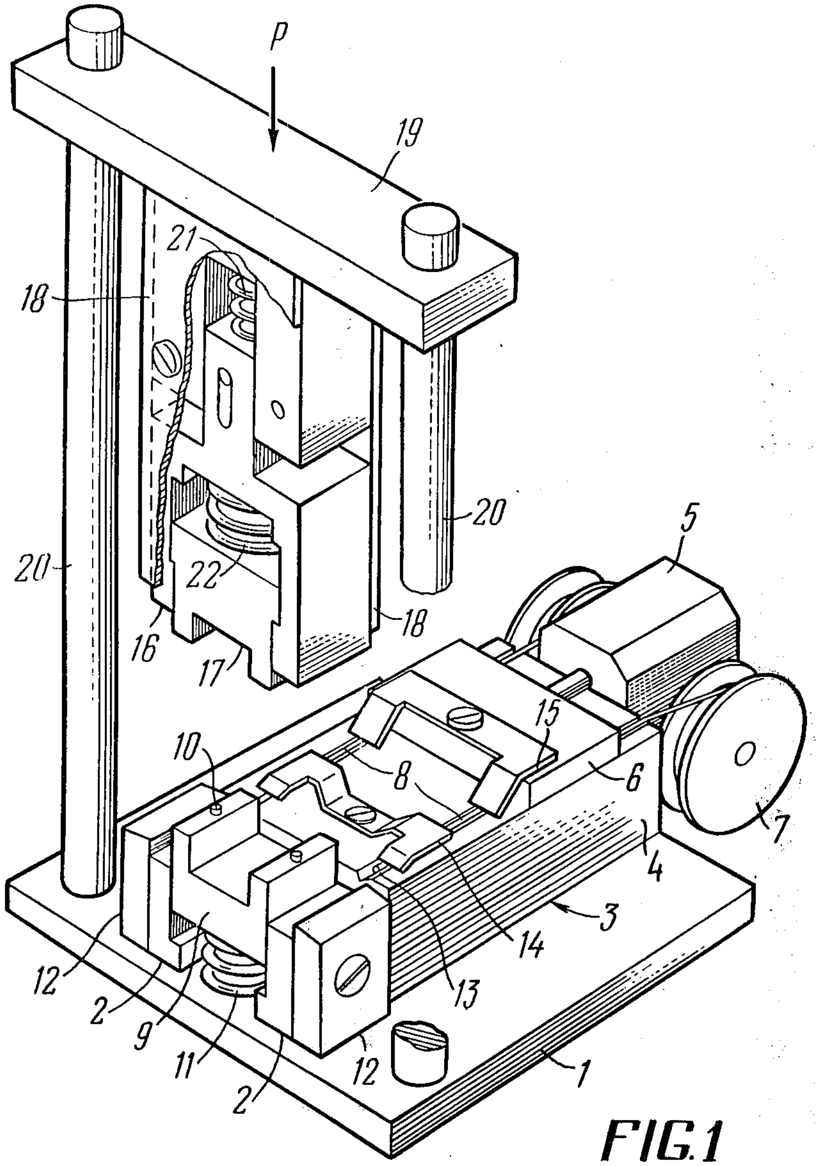
FIG. 1 is a general isometric view of a device of the present invention.

Referring now to FIG. 1, the proposed device comprises a base 1, mounted whereupon are a female die, made up of two fixed jaws 2, and a solder supply unit 3 incorporating a casing 4, a solenoid 5, controlling the movement of a slider 6, and two containers 7 with a wire solder 8.

Arranged between the jaws 2 is a microcircuit holder 9 which is provided with two locking pins 10.

The holder 9 rests upon a coiled spring 11; when found in its extreme lower position (when the spring 11 is compressed), it forms, together with the jaws 2, a profile for bending microcircuit leads (not shown). Mounted upon the outer lateral surfaces of the jaws 2 are blades 12 for cutting leads. The cutting edges of the blades 12 protrude over the plane of the upper base of the jaws 2 by a value which is somewhat less than the diameter of the wire solder 8.

Upon the upper surface of the casing 4, coinciding with the plane of the upper base of the jaws 2, there are V-shaped guide grooves 13 for the supply of the solder 8.

The solder 8 is pressed against the guides 13 by folded tabs of flat springs 14 and 15 that are mounted upon the casing 4 and the slider 6, respectively. The spring 15 serves for the supply of the solder 8, and the spring 14 holds the solder in place during the back stroke of the slider 6.

The profile of the jaws 2 and the holder 9 coincides with that of a male die 16 with a clamp 17 which are arranged between plates 18 mounted on a top plate 19. The latter is adapted to slide in a reciprocating fashion along guide columns 20.

The male die 16 and the clamp 17 are loaded by coiled springs 21 and 22, respectively, their lower working surfaces protruding beyond the end face of the plates 18.

The compression stress of the spring 21 is greater than that of the spring 22, but less than that of the spring 11.

The clamp 17 is provided with holes (not shown) to receive the locking pins 10 as it mates with the holder 9.

Figure 2:
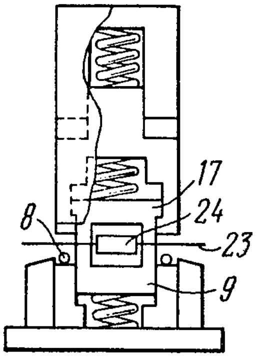
FIG. 2 is a lateral view of the device, in accordance with the invention, prior to molding leads of a microcircuit.
Figure 3:
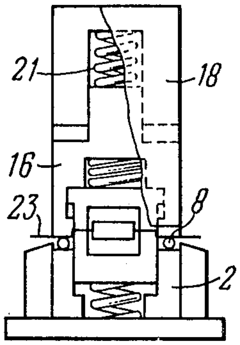
FIG. 3 shows the device of FIG. 2 at the time of molding.
Figure 4:
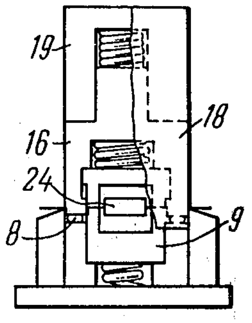
FIG. 4 shows the device of FIG. 2 at the time of cutting leads and applying a solder thereupon.

FIGS. 2 through 4 represent schematically a lateral view of the proposed device at different moments of operation thereof. In FIG. 2, in particular, the device is shown in a position when leads 23 of a microcircuit 24 are pressed by the clamp 17 against the holder 9.

FIG. 3 shows the proposed device at a moment of molding the leads 23.

FIG. 4 shows the same device at a moment of cutting the leads 23 and applying the solder 8 onto them.

Figure 5:
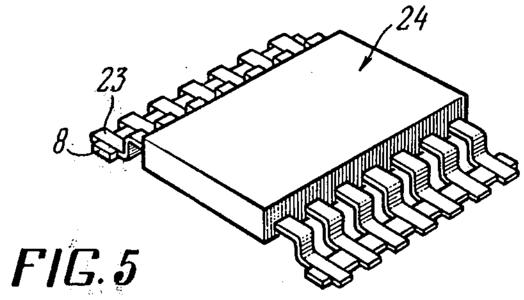
FIG. 5 shows an integrated microcircuit with leads prepared for printed wiring.

FIG. 5 shows the integrated circuit 24 after molding and cutting the leads 23 with the solder 8 applied onto them.

The proposed device operates as follows.

In the initial, upper, position of the table 19, as is shown in FIG. 1, a microcircuit (not shown) is placed upon the holder 9 and positioned by the pins 10 which enter the gap between the two adjoining leads; then the solenoid 5 is energized, and the slider 6 starts moving along the casing 4 in the direction of the microcircuit; as this takes place, the spring 15 mounted upon the casing 4 feeds the solder 8 under the leads of the microcircuit.

Under the action of a force P applied to the plate 19, the latter moves down, and the clamp 17 presses the leads 23 (FIG. 2) of the microcircuit 24 against the holder 9.

As the plate 19 moves further (FIG. 1), the male die 16 (FIG. 3) molds, by the stress of the spring 21, the leads 23, pressing them against the solder 8. Then, the plates 18, enveloping the jaws 2 on both sides, cut the solder 8; after the male die 16 and the top plate 19 lock, the microcircuit 24 moves down, together with the holder 9, its leads 23 are pressed into the solder 8 and simultaneously cut by the blades 12 (FIG. 4).

After that the plate 19 is moved upward to resume its initial position. As this takes place, the holder 9, under the action of the spring 11, resumes its initial position, and the leads 23 of the microcircuit 24 with the solder 8 applied onto them are lifted above the upper surface of the jaws 2, thus facilitating removal of the microcircuit from the device. Simultaneously, the solenoid 5 transfers the slider 6 to its initial position. Subsequently, the operating cycle of the proposed device is repeated.

What is claimed is:

1. A device for preparing integrated microcircuits for printed wiring comprising in combination: a base; a female die in the form of two jaws; said jaws having lower surfaces which are fixedly attached to said base; upper surfaces of said jaws being located opposite to said lower surfaces; inner surfaces of said jaws being in perpendicular to said lower surfaces and facing each other; and outer surfaces of said jaws extending in parallel with the said inner surfaces; a microcircuit holder located between said jaws for gliding movement on said inner surfaces of the jaws; a spring between said base and said holder for normally biasing the latter away from the former; a solder supply unit; guides for said solder supply unit being disposed on the level of said upper surfaces of the jaws so as to extend in parallel with their inner surfaces and adapted to supply solder immediately below the ends of the outputs of said microcircuits; knives for cutting off the outputs of said microcircuits; a punch having a groove located directly opposite to said holder for the microcircuits; a clamp disposed in said groove; a second spring disposed in said groove between said punch and said clamp; a plate interacting with said punch so as to be movable relative to the latter in the direction of punch motion and of absorbing the working pressure thereof; a third spring disposed between said plate and said punch; and a means for cutting off a predetermined portion of the solder required for one microcircuit.

2. A device as claimed in claim 1, said knives for cutting off the outputs of the microcircuits being attached to said outer surfaces of said jaws and projecting over the upper surfaces by an extent which is lesser than the thickness of the supplied solder.

3. A device as claimed in claim 1, said means for cutting off a portion of the solder having the form of two blades, said blades being attached to said plate in planes extending in perpendicular to said guides and embracing said punch.

* * * * *